United States Patent [19]
Hiraishi et al.

[11] Patent Number: 5,588,292
[45] Date of Patent: Dec. 31, 1996

[54] EXHAUST GAS PURIFIER

[75] Inventors: Masahiro Hiraishi, Kyoto; Shin-ichi Kuroda, Osaka, both of Japan

[73] Assignee: Shimadzu Corporation, Japan

[21] Appl. No.: 493,213

[22] Filed: Jun. 20, 1995

[30] Foreign Application Priority Data

Jun. 28, 1994 [JP] Japan .................... 6-146499

[51] Int. Cl.⁶ .................................... F01N 3/28
[52] U.S. Cl. ............................ 60/300; 422/174
[58] Field of Search ................. 60/300; 422/174

[56] References Cited

U.S. PATENT DOCUMENTS 5,419,878  5/1995  Honma ........................ 60/300

FOREIGN PATENT DOCUMENTS 651814  10/1991  Australia ..................... 60/300
203812  12/1982  Japan ......................... 60/300

*Primary Examiner*—Douglas Hart
*Attorney, Agent, or Firm*—Majestic, Parsons, Siebert & Hsue

[57] ABSTRACT

An exhaust gas purifier uses a honeycomb of an electrically non-conductive material, formed with a plurality of longitudinally extending throughholes through which an exhaust gas is adapted to flow. A conductive layer is formed with an electrically conductive material on inner surfaces of parts of the honeycomb, including at least a portion of each end surface of the honeycomb and a selected center portion of the honeycomb longitudinally extending between the end surfaces where the flow rate of the exhaust gas is higher than elsewhere inside the honeycomb.

20 Claims, 4 Drawing Sheets

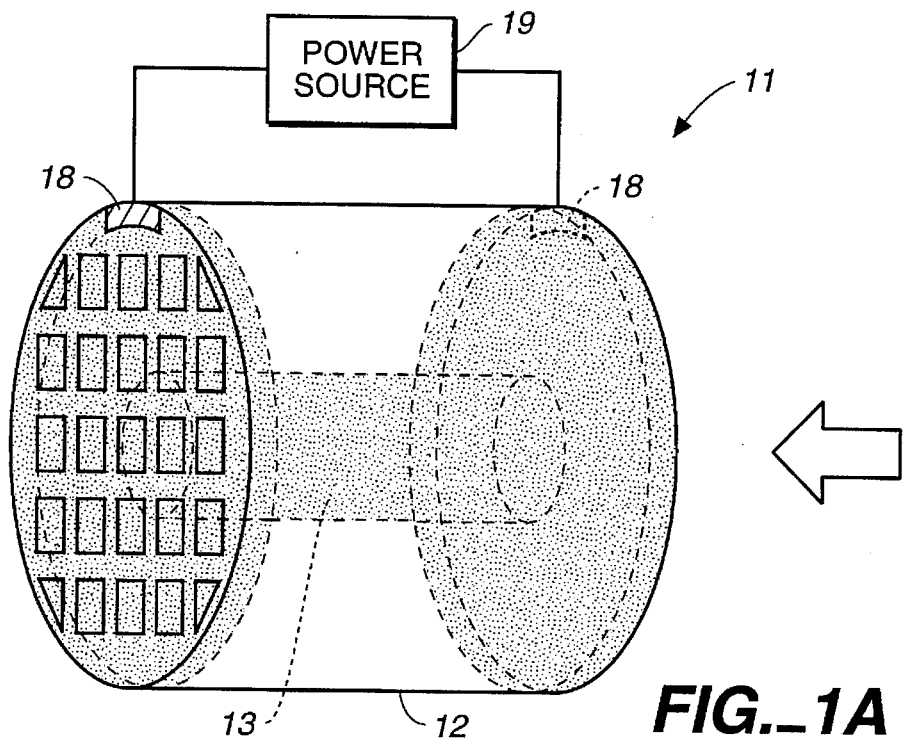
FIG._1A
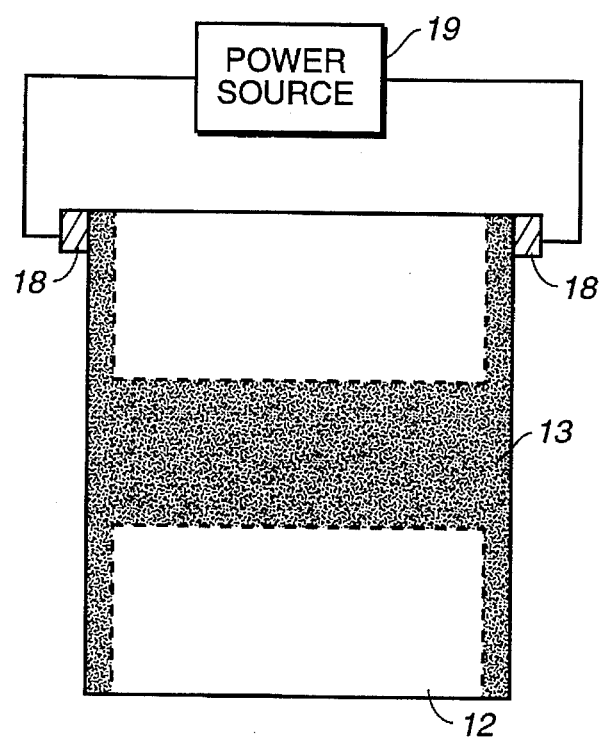
FIG._1B

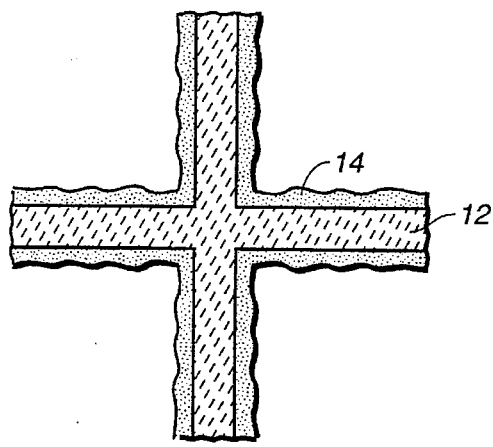
FIG._2A
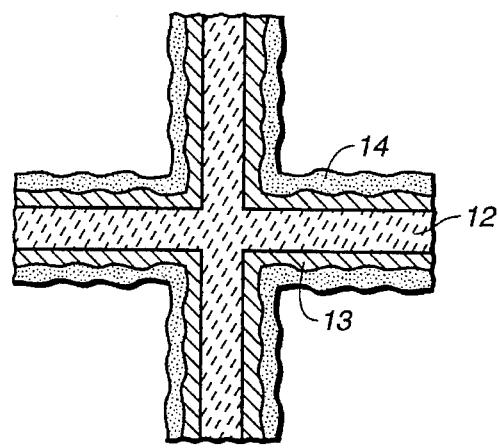
FIG._2B
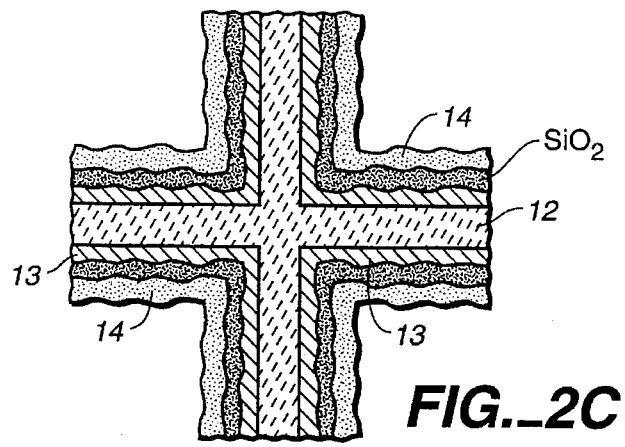
FIG._2C
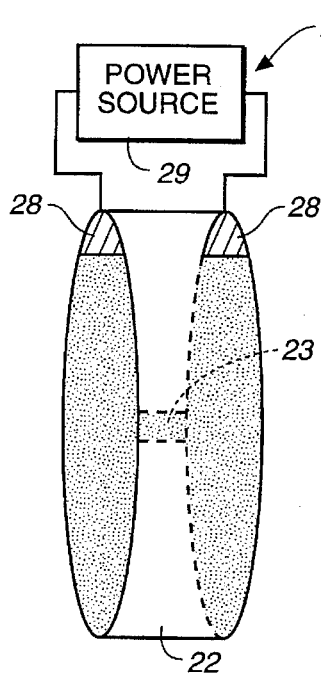
FIG._3A
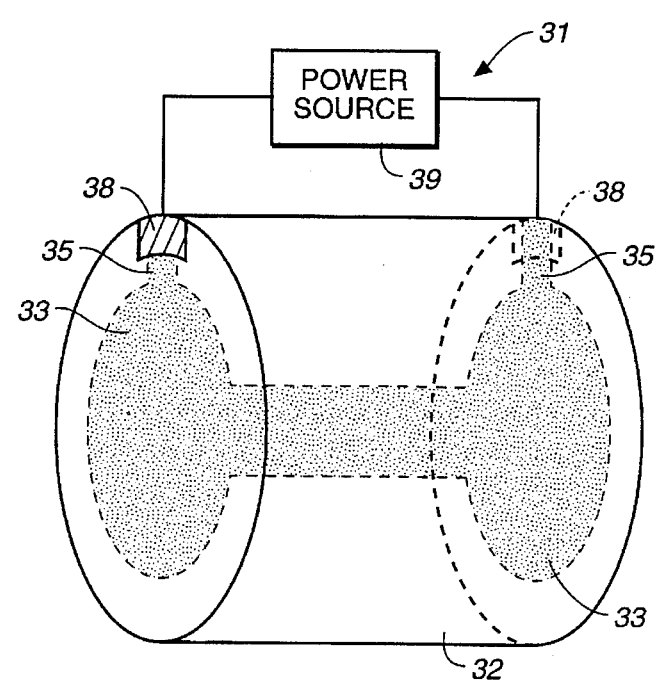
FIG._3B

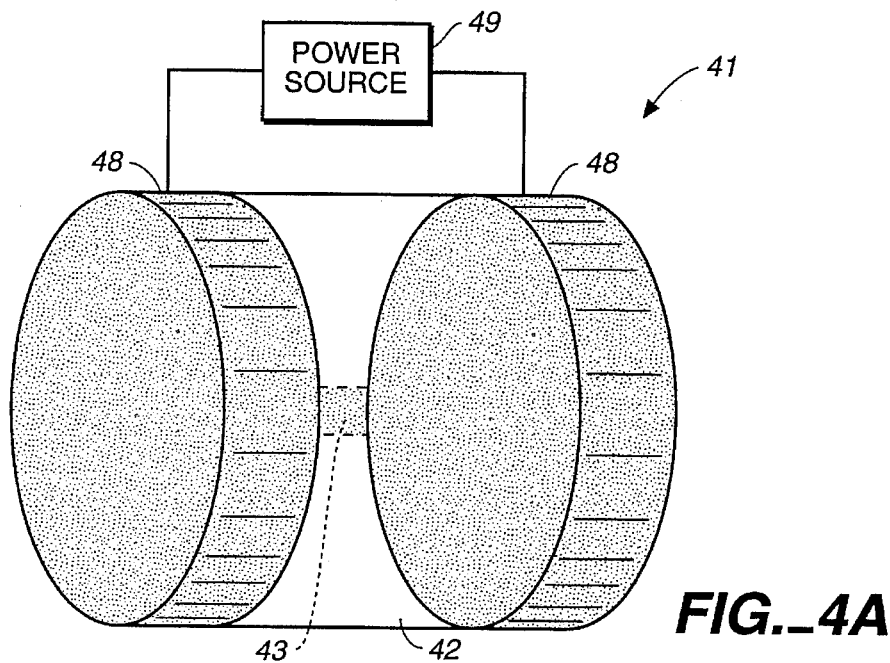
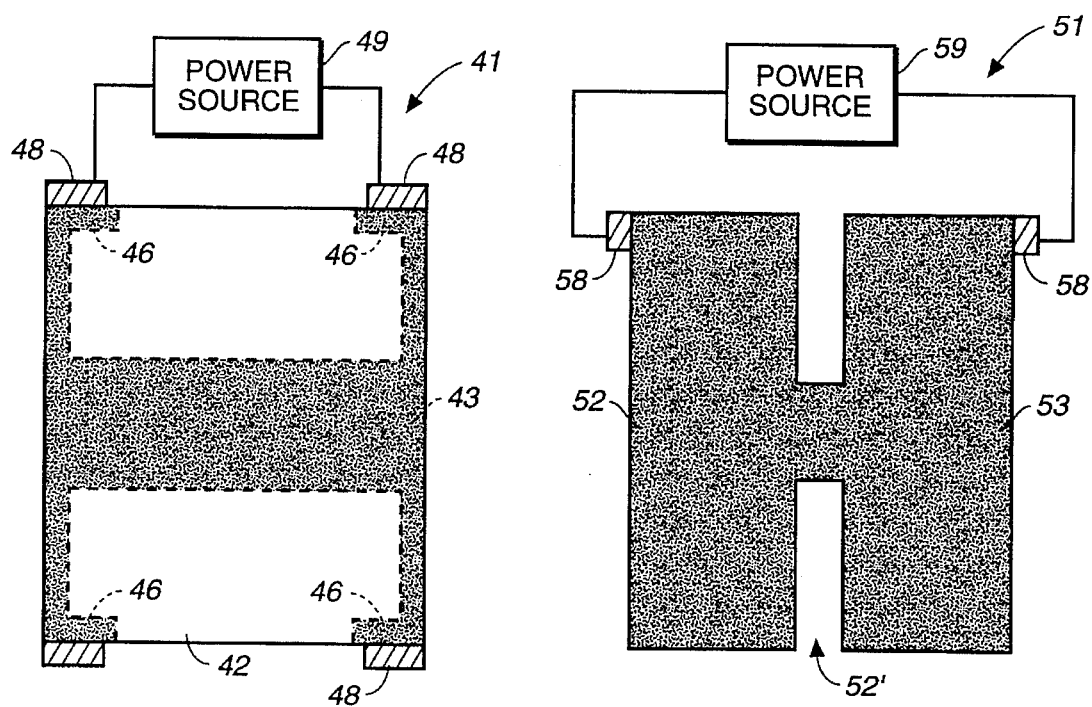
*FIG._4A*
*FIG._4B*   *FIG._5*

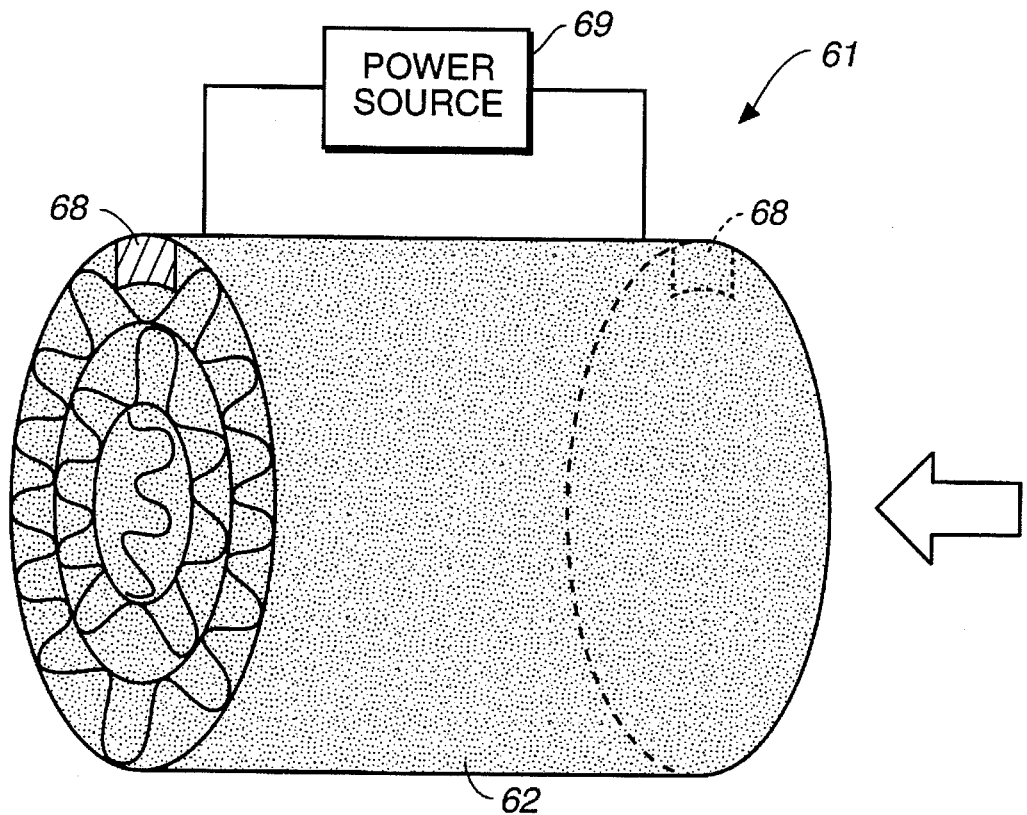
FIG._6A
*(PRIOR ART)*
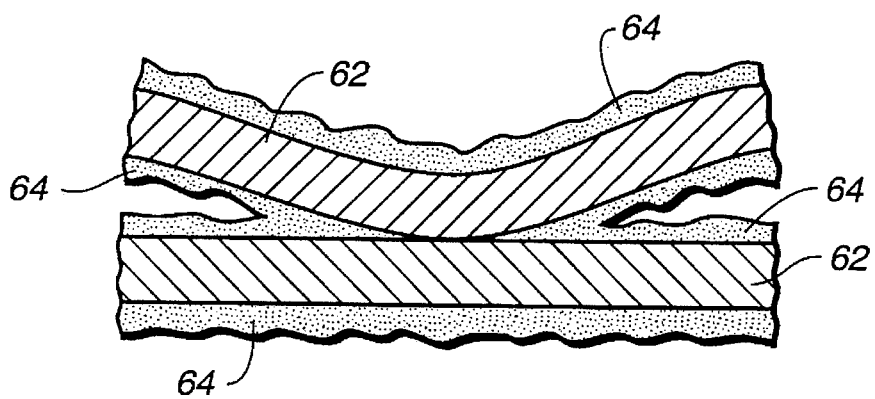
FIG._6B
*(PRIOR ART)*

5,588,292

1
EXHAUST GAS PURIFIER

BACKGROUND OF THE INVENTION

This invention relates to a device for purifying an exhaust gas and, more particularly, to such a device which can be used effectively against an exhaust gas from an automobile engine.

In order for an exhaust gas purifier using a catalyst to be able to function effectively, the temperature of the catalyst must be above its activation temperature. For this reason, there have been various attempts to provide a means for heating the catalyst such that it can start functioning quickly as an effective catalyst even during the start-up period of an engine when the temperature of the exhaust gas therefrom is still relatively low.

For example, it has been proposed to use a metal as a catalyst substrate and to pass an electric current therethrough to heat and activate the catalyst supported on its surface. FIG. 6A shows a device 61 based on this idea, characterized as comprising a metallic substrate 62, electrodes 68 and an electric power source 69. The substrate 62 has many longitudinally oriented through holes and hence is commonly referred to as a honeycomb. The arrow shows the direction in which an exhaust gas to be purified is passed through the device 61. As shown in FIG. 6B, a catalyst layer 64 is formed directly on the inner surfaces of the honeycomb 62. As power is supplied from the power source 69 to the honeycomb 62 through the electrodes 68, the electrically conductive metallic honeycomb 62 serves as a portion of a closed circuit and becomes heated due to its own resistance. The temperature of the catalyst layer 64 on its inner surface is raised accordingly, reaching the activation temperature of the catalyst, such that harmful components of the exhaust gas such as CO, $NO_x$ and HC are removed by the catalyst layer 64 as the exhaust gas passes through the throughholes of the honeycomb 62.

A prior art device thus structured has several problems. Firstly, since the metallic honeycomb has low resistance and cannot function effectively as a heater, the catalyst carried thereon cannot be heated efficiently and its temperature cannot be raised quickly. Secondly, temperature does not become uniform throughout the catalyst layer when the exhaust gas is passed through. As a result, the effect of purification becomes variable from one position to another where the exhaust gas passes. In the case of a honeycomb with a circular cross-sectional shape, for example, the flow of the gas is fast near the center of the honeycomb and slow near its peripheries. Consequently, the temperature becomes lower near the center due to heat exchange, and the catalyst cannot perform its function effectively.

SUMMARY OF THE INVENTION

It is therefore an object of this invention to eliminate the aforementioned problems of prior art exhaust gas purifiers.

A device for purifying exhaust gas according to this invention, with which the above and other objects can be accomplished, may be characterized not only as comprising a substrate having a honeycomb-like structure made of a non-conductive material and a catalyst layer on its surface but also wherein a conductive layer is formed with an electrically conductive material on inner surfaces of at least a portion of the honeycomb, including at least a portion of each end surface of the honeycomb and a portion of the honeycomb longitudinally extending between its side surfaces where the flow rate of the exhaust gas through said honeycomb is higher than elsewhere inside the honeycomb.

With a purifier thus formed, an electric current is passed through the conductive layer which is formed longitudinally inside the honeycomb. Since the conductive layer has a suitable resistance, its temperature rises and the catalyst is heated. Since the conductive layer is formed only where the flow rate of the exhaust gas is relatively large, central parts of the honeycomb where heat exchange takes place actively are more effectively heated, while peripheral parts where the flow is slow and not much cooling takes place are heated only through thermal conduction from the center parts. As a result, the temperature distribution inside the honeycomb becomes uniform and the activity of the catalyst becomes also uniform.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1A is a schematic external view of an exhaust gas purifier embodying this invention for showing its basic structure, and FIG. 1B is its sectional side view;

FIG. 2A is a schematic sectional view of a portion of the honeycomb of FIGS. 1A and 1B where a conductive layer is not formed, FIG. 2B is a schematic sectional view of a portion of the honeycomb of FIGS. 1A and 1B where a conductive layer is formed, and FIG. 2C is a schematic sectional view of a portion of the honeycomb of FIGS. 1A and 1B if a $SiO_2$ layer is also formed;

FIGS. 3A and 3B are schematic sectional side views of other exhaust gas purifiers embodying the invention;

FIG. 4A is a schematic external view of still another exhaust gas purifier embodying this invention for showing its basic structure, and FIG. 4B is its sectional side view;

FIG. 5 is a schematic external view of still another exhaust gas purifier embodying this invention; and FIG. 6A is a schematic external view of a prior art exhaust gas purifier, and FIG. 6B is a schematic sectional view of a portion of the honeycomb of FIG. 6A.

Throughout herein, components which may be considered substantially identical or at least functionally equivalent to each other are indicated by numbers having the same numeral in the last digits such as numerals 19, 29, 39, etc. all indicating a power source.

DETAILED DESCRIPTION OF THE INVENTION

FIGS. 1A and 1B show an exhaust gas purifier 11 embodying this invention comprising a honeycomb 12 made of an electrically non-conductive material, electrodes 18 and an electrical power source 19. The honeycomb 12 is a cylindrical substrate structure having many axially extending throughholes between its end surfaces. According to the embodiment which is illustrated, these throughholes are aligned vertically and horizontally in a lattice-like arrangement. The arrow indicates the direction in which the exhaust gas to be purified is passed through the honeycomb 12. The electrodes 18 are attached to the end surfaces of the honeycomb 12, both connected to the power source 19.

As shown in FIGS. 2A and 2B, a catalyst layer 14, for example, of platinum is formed on the inner walls of the honeycomb 12. In peripheral portions of the honeycomb 12, the catalyst layer 14 is formed directly on the inner walls of the honeycomb 12, as shown in FIG. 2A. On the end surfaces and through a center part of the honeycomb 12, axially extending and reaching both its end surfaces, an electrically conductive layer 13 is formed between the inner walls of the honeycomb 12 and the catalyst layer 14, as shown in FIG. 2B, such that an electrically conductive path is formed, connecting the end surfaces of the cylindrically-shaped honeycomb 12. For the convenience of illustration, the electrically conductive path formed by the conductive layer 13 is indicated by a shading in FIGS. 1A and 1B.

The honeycomb 12 is preferably formed with a ceramic material such as cordierite. It is because ceramic materials have porous surfaces and, if a catalyst layer is formed on such a surface, the area on which the catalyst is carried is effectively increased. In other words, the effective contact surface between the exhaust gas and the catalyst is advantageously increased. Although the honeycomb 12 is not required to be ceramic, it must be of an electrically non-conductive material, according to this invention. Its cross-sectional shaped need not be circular. It may be elliptical or quadrangular, for example. Its axial length, too, may be varied, according to the desired purification capability of the purifier.

The conductive layer 13 may preferably comprise silicide such as molybdenum silicide ($MoSi_2$), aluminide (TiAl), molybdenum silicide-alumina thermet, silicon-nickel-molybdenum alloy or stainless steel. The conductive layer 13 may be formed, for example, first by mixing powder of such a material with a solvent such as lacquer, dispersing it in an organic solvent such as acetone or ethanol, applying the solution to selected portions of the honeycomb 12 by pouring or brushing it over where the layer is wanted, and then drying and sintering. Since a layer thus formed is very porous, it has a very large area of contact with the exhaust gas and can enhance the purification capability of the catalyst although this invention is not limited to a porous conductive layer.

If molybdenum silicide is used for forming the conductive layer 13, it is preferable to carry out a passive oxidation process at 600° C.–1000° C. in an oxygen-containing atmosphere after the sintering process. If this is done, $SiO_2$ is generated from molybdenum silicide $MoSi_2$, and a protective layer comprising $SiO_2$ is formed on the surface of the conductive layer 13, as shown in FIG. 2C. The catalyst layer 14 is formed on such a protective layer, and this serves to improve the durability of the exhaust gas purifier.

The dimensions and position of the conductive layer 13, such as the layer thickness, are determined by balancing the electric resistance of the conductive layer 13 on the end surfaces and the interior of the honeycomb 12. If the resistance of the portion of the conductive layer 13 formed on an end surface of the honeycomb 12 is greater than that at the center of the honeycomb 12, heat is generated mostly in the end surface region of the honeycomb 12 when an electric current is passed therethrough and temperature will not rise as expected inside the honeycomb 12. The overall shape of the honeycomb 12, the flow condition of the exhaust gas therethrough (such as the extent to which the flow tends to be concentrated in the center part of the honeycomb 12) and the non-uniformity of temperature due to heat exchange are among the factors to be also taken into consideration in designing the conductive layer 13.

The electrodes 18 need not be formed directly on the end surfaces of the honeycomb 12 in contact with the conductive layer 13. A separate member may be inserted therebetween as a connector. Examples of material for such a connector include conductive pastes of silver and silver-palladium. Alternatively, powder of stainless steel may be applied and sintered. Such materials may be used also for adjusting the resistance of the honeycomb 12 at its end surfaces. Instead of using metal plates as the electrodes 18, portions of the conductive layer 13 formed on the end surfaces of the honeycomb 12 may be used directly as the electrodes.

The electric power source 19 supplies a direct current (DC) or a rectangular DC wave. For achieving a quick heating process, it is preferred to use a rectangular wave.

FIGS. 3A and 3B show two of the variations of the exhaust gas purifier (at 21 and 31) embodying the present invention. The example shown in FIG. 3A is characterized as having an extremely short flow path for the exhaust gas, that is, its honeycomb 22 has a short axial length as compared to the diameter of its cylindrically shaped honeycomb. The example shown in FIG. 3B is characterized as not having its conductive layer 33 formed all over each of the end surfaces of its cylindrically shaped honeycomb 32 but only in a selected portion of its interior part where the flow rate of the exhaust gas is high (near the center axis) and radially extended portions 35 on the end surfaces leading to the electrodes 38 connected to the power source 39. FIGS. 4A and 4B show still another variation (at 41) characterized as having a conductive layer 43 formed not only all over both of the end surfaces of its cylindrically shaped honeycomb 42 but also on edge portions 46 of the peripheral side surface of the honeycomb 42 such that the attachment of electrodes becomes easier. A purifier according to this design is convenient also because tubular electrodes 48 may be attached surrounding the honeycomb for improved electrical contacts. Attachment of electrodes on the side surface is advantageous because the electrodes thus attached do not interfere with the flow of the exhaust gas.

FIG. 5 shows still another variation (at 51) characterized as having its generally cylindrically shaped honeycomb 52 formed with an annular slit 52' in a peripheral region between its two end surfaces and having the conductive layer 53 formed throughout the interior of the slitted honeycomb 52. This design is advantageous in that the resistance of the end surface portions and the center section can be adjusted easily, that the production is simple and that the flow of the exhaust gas becomes turbulent in the space of the slit 52' to produce an eddy flow condition which tends to improve the purification efficiency.

Exhaust gas purifiers according to this invention are generally characterized as causing an electric current from a power source to flow through a conductive layer formed on a honeycomb-like catalyst-carrying structure so as to quickly heat the catalyst to its activation temperature and convert harmful components like $NO_x$, CO and HC in the exhaust gas passing through the empty space inside the honeycomb into harmless compounds like $N_2$, $CO_2$ and $H_2O$. Because the conductive layer is formed near the center axis of the honeycomb where the exhaust gas has a high flow rate, the center part where temperature tends to drop because of heat exchange is heated particularly well. The peripheral part of the honeycomb, where the flow rate of the exhaust gas is low and temperature does not drop significantly, is not heated directly. This part is heated only through thermal conduction from the center part. Thus, temperature becomes uniform throughout the interior of the honeycomb, and the purification efficiency also becomes substantially uniform throughout. In summary, the catalyst is instantly heated even during a start-up period of an automobile engine when the temperature of the exhaust gas is still relatively low. Because the conductive layer is formed independently of the honeycomb, the material strength of the equipment as a whole is not influenced by the material of the conductive layer. In other words, the materials for the honeycomb and the conductive layer can be selected more freely.

What is claimed is:

1. An exhaust gas purifier comprising:

a honeycomb of an electrically non-conductive material, formed with a plurality of longitudinally extending throughholes and having end surfaces which are longitudinally opposite each other wherein an exhaust gas can flow through said throughholes from one to the other of said end surfaces;

a conductive layer formed with an electrically conductive material on inner surfaces of parts of said honeycomb, said parts including at least a portion of each of said end surfaces and a selected portion of said honeycomb longitudinally extended between said end surfaces;

a catalyst layer containing a catalyst, formed on inner surfaces of said honeycomb;

heating means for heating said honeycomb by causing an electric current to pass through said conductive layer and thereby activating said catalyst.

2. The exhaust gas purifier of claim 1 wherein said conductive layer is formed all over said end surfaces and also on portions of peripheral outer surface of said honeycomb adjacent said end surfaces.

3. The exhaust gas purifier of claim 1 wherein said selected portion of said honeycomb is where the flow rate of said exhaust gas through said honeycomb is higher than elsewhere inside said honeycomb.

4. The exhaust gas purifier of claim 2 wherein said selected portion of said honeycomb is where the flow rate of said exhaust gas through said honeycomb is higher than elsewhere inside said honeycomb.

5. The exhaust gas purifier of claim 1 wherein said heating means include an electric power source and electrodes attached to said honeycomb and to said electrical power source.

6. The exhaust gas purifier of claim 2 wherein said heating means include an electric power source and electrodes attached to said honeycomb and to said electrical power source.

7. The exhaust gas purifier of claim 3 wherein said heating means include an electric power source and electrodes attached to said honeycomb and to said electrical power source.

8. The exhaust gas purifier of claim 4 wherein said heating means include an electric power source and electrodes attached to said honeycomb and to said electrical power source.

9. The exhaust gas purifier of claim 1 wherein said conductive layer is formed between said inner surfaces of said honeycomb and said catalyst layer.

10. The exhaust gas purifier of claim 2 wherein said conductive layer is formed between said inner surfaces of said honeycomb and said catalyst layer.

11. The exhaust gas purifier of claim 3 wherein said conductive layer is formed between said inner surfaces of said honeycomb and said catalyst layer.

12. The exhaust gas purifier of claim 4 wherein said conductive layer is formed between said inner surfaces of said honeycomb and said catalyst layer.

13. The exhaust gas purifier of claim 3 wherein said honeycomb comprises a ceramic material.

14. The exhaust gas purifier of claim 4 wherein said honeycomb comprises a ceramic material.

15. The exhaust gas purifier of claim 1 wherein said conductive layer comprises sintered electrically conductive particles.

16. The exhaust gas purifier of claim 2 wherein said conductive layer comprises sintered electrically conductive particles.

17. The exhaust gas purifier of claim 3 wherein said conductive layer comprises sintered electrically conductive particles.

18. The exhaust gas purifier of claim 4 wherein said conductive layer comprises sintered electrically conductive particles.

19. The exhaust gas purifier of claim 1 wherein said honeycomb is cylindrical, having annular slits formed peripherally, said conductive layer being formed throughout inside said honeycomb.

20. The exhaust gas purifier of claim 2 wherein said honeycomb is cylindrical, having annular slits formed peripherally, said conductive layer being formed throughout inside said honeycomb.

* * * * *